United States Patent
Rode et al.

[11] Patent Number: 6,085,259
[45] Date of Patent: Jul. 4, 2000

[54] ADDRESSING APPARATUS AND METHOD

[75] Inventors: Detlef Rode, Hemmingen; Uwe Zurmuehl, Giesen, both of Germany

[73] Assignee: Robert Bosch GmbH, Stuttgart, Germany

[21] Appl. No.: 09/085,629

[22] Filed: May 27, 1998

[30] Foreign Application Priority Data

May 27, 1997 [DE] Germany ............................ 197 22 115

[51] Int. Cl.⁷ ................................................ G06F 13/374
[52] U.S. Cl. ...................... 710/9; 710/2; 710/4; 361/686; 361/787; 361/796
[58] Field of Search ...................... 710/2, 4, 9; 361/796, 361/686, 797

[56] References Cited

U.S. PATENT DOCUMENTS

| | | | |
|---|---|---|---|
| 3,647,972 | 3/1972 | Glover et al. | 379/93.37 |
| 4,236,086 | 11/1980 | Hoebel | 307/149 |
| 5,111,203 | 5/1992 | Calkins | 341/141 |
| 5,592,366 | 1/1997 | Goldman et al. | 361/796 |
| 5,745,786 | 4/1998 | Juall | 710/9 |
| 5,948,077 | 9/1999 | Choi et al. | 710/9 |
| 6,009,491 | 12/1999 | Roppel et al. | 710/128 |

*Primary Examiner*—Thomas C. Lee
*Assistant Examiner*—Tammara Peyton
*Attorney, Agent, or Firm*—Kenyon & Kenyon

[57] ABSTRACT

An addressing apparatus and a corresponding method are described, such that addressing of network components, which are connected via a bus and which each have an address including a permanent base address and an offset address linked thereto, is accomplished with a device for transmitting the address via the bus. A coding device, insertable between the bus and a relevant network component, for defining the corresponding offset address using one or more predetermined coding signals generated thereby, is additionally provided. It is possible thereby to achieve a simple manner of addressing components (which preferably have identical functions and identical base addresses) that requires no manual action by the user on the components.

14 Claims, 2 Drawing Sheets

ADDRESSING APPARATUS AND METHOD

FIELD OF THE INVENTION

The present invention relates to an addressing apparatus for addressing network components that are connected via a bus and each have an address including a permanent base address and an offset address linked thereto. The addressing apparatus includes a device for transmitting the address via the bus. In addition, the present invention relates to a corresponding addressing method.

BACKGROUND INFORMATION

Although usable on any network, the present invention and the problem underlying it are explained with reference to a network located in a motor vehicle, e.g. the real-time-capable "Controller Area Network" (CAN) serial bus system.

It is commonly necessary to equip network components that are connected via a bus with unequivocal addresses so that messages can be exchanged in directed manner, with an unequivocal allocation, between them. In the present case "addresses" will hereinafter be understood to mean not only addresses of logical point-to-point connections, but also identifiers of object-oriented systems, for example of the CAN system.

These addresses can be permanently allocated to respective network components. For example, the address $00_{hex}$ could be permanently allocated to an operating element for an information transfer system in the motor vehicle, and the address $08_{hex}$ to a CD changer.

With this permanent address allocation, however, if two identical network components (two CD changers, in the example selected) are operated in the same network, they cannot be individually addressed, i.e. they cannot be individually called up by the operating element (e.g. the car radio), and thus also cannot be distinguished.

The general problem underlying the present invention is thus to make such identical network components individually addressable.

At present, the existing art contains three fundamental approaches to solving this problem.

The first approach provides a programming capability in the network components in order to code them. A software setup accordingly takes place separately in each corresponding network component. This approach is very labor intensive, however, since it requires that each corresponding network component have an input device and an output device to allow the software setup to be performed by a user. An input/output device of this kind can be comparable to a personal computer (PC) or can have an interface therewith.

The second approach provides a hardware wiring capability in the network components in order to code them, i.e., for example, DIP switches or jumpers. This method is also known from measurement and control technology. Here again, an action on the part of the user to set the individual addresses is necessary.

Finally, the third approach provides for assigning an address that is unique (in some circumstances worldwide), consisting for example of a manufacturer name, a product name, and a serial number. Unique addresses of this kind are possible when using assemblies with apportioned and sequential serial numbers (cf., Ethernet). For components having an EEPROM, a unique address can, for example, be assigned during production. Unique codes of this kind allows to assign the particular address or identifier dynamically.

The fact that the above described approaches require a high outlay of cost and operation has proven to be disadvantageous.

SUMMARY OF THE INVENTION

An addressing apparatus according to the present invention has an advantage that it offers a simple external coding capability without requiring any manual action by a user upon the network components themselves.

According to the present invention, a permanent base address and an offset address within a predetermined range are first allocated to each network component.

The predefined range (address space) for the offset address in the addressing formula of the system defines the maximum number of components addressable via the same base address, said components preferably being identical or having identical functions.

The offset address itself is defined by the coding plug according to the present invention. The address of the relevant network component set in this manner is then, in the simplest case, calculated additively using the following equation:

ADDRESS=BASE ADDRESS+OFFSET ADDRESS

Accordingly, given k network components, k-1 coding plugs are advantageously used, k being a natural number greater than 1. The actual possible magnitude of k is determined, in this context, from the magnitude of the address space provided, for example:

OFFSET ADDRESS=0, 1, 2, . . . lim where lim is a natural number which designates the limit of the offset address space.

Offset address 0 is advantageously achieved by simply omitting the coding plug. This also yields a cost saving.

According to a preferred exemplary embodiment, the coding device is a coding plug, in particular a coding attachment plug or a coding adapter. This use of a plug allows a simple and economical type of connection between the bus and the respective network component. The particular advantage of an attachment plug or adapter is the capability of easy retrofitting to existing systems.

According to a further preferred exemplary embodiment, the coding plug has on the output side, in addition to the bus connectors, n digital coding connectors which each generate a digital coding signal, n being a natural number. This type of coding signal is highly resistant to interference and easily processed.

According to another preferred exemplary embodiment, the digital coding signals are tapped directly from supply potential lines running via the bus. This is an economical way to obtain the digital coding signals.

According to yet another preferred exemplary embodiment, the digital coding signals are applied to corresponding input ports of a microcontroller in the relevant network component for analysis.

According to a further preferred exemplary embodiment, the input ports of the microcontroller are connected to a reference potential via a respective pulldown resistor. This ensures a defined offset address in the absence of a coding plug, for example $00_{hex}$ when GROUND is the reference potential.

According to another preferred exemplary embodiment, the coding plug has on the output side, in addition to the bus connectors, an analog coding connector which furnishes an analog coding signal. This type of configuration has the advantage that only a single additional input connector is needed for the network components.

According to yet another preferred exemplary embodiment, the analog coding signal is tapped, via a voltage divider, from supply potential lines running via the bus.

This is an economical way to obtain the analog coding signal.

According to a further preferred exemplary embodiment, the analog coding signal is applied to a corresponding input port of a microcontroller, with analog/digital converter, of the relevant network component for analysis.

According to another preferred exemplary embodiment, the input port of the microcontroller with analog/digital converter is connected to a reference potential via a pull-down resistor. Similarly to the digital case described above, this ensures, for analog coding, a defined offset address in the absence of a coding plug, e.g. $00_{hex}$ when GROUND is the reference potential.

According to yet another preferred exemplary embodiment, the voltage divider has two resistors, of which one is housed in the coding plug and one in the relevant network component. This has the advantage that the resistor housed in the relevant network component can simultaneously serve as the pulldown resistor.

According to a further preferred exemplary embodiment, the network components are identical components. Specifically in the case of such components having identical functions, the proposed addressing formula makes a substantial contribution to the simplification of address management.

According to another preferred exemplary embodiment, the bus includes the "Controller Area Network" serial bus system.

According to yet another preferred exemplary embodiment, when the addressing apparatus according to the present invention is utilized on a network located in a motor vehicle, the coding device is provided in preinstalled manner at at least one corresponding point in a chassis bus of the motor vehicle. This physical configuration ensures an allocation of the individual network components that is always correct and corresponds to the preinstalled coding plugs.

DETAILED DESCRIPTION OF THE DRAWINGS

Figure 1:
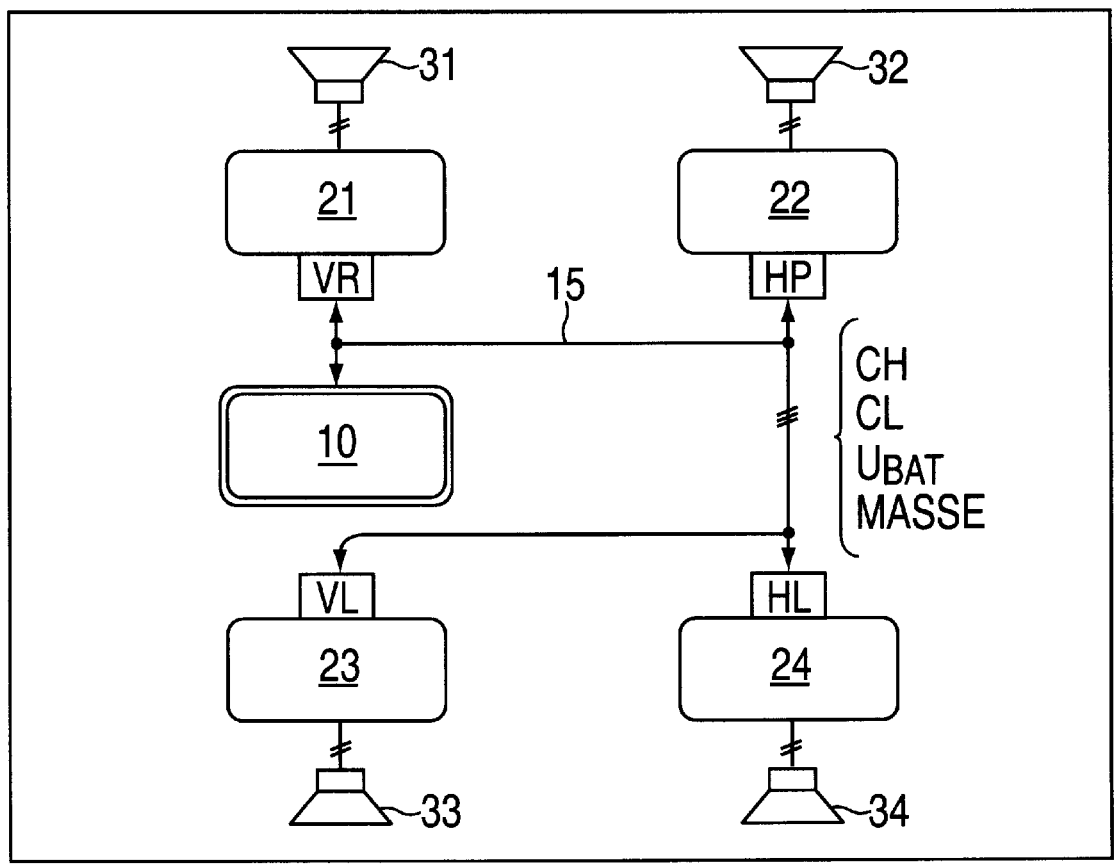
FIG. 1 shows a block diagram of a networked car radio having four identical amplifier units, as an exemplary embodiment according to the present invention.

FIG. 1 illustrates a block diagram of a networked car radio 10 having four identical amplifier units 21, 22, 23, 24 connected via a bus 15, as an exemplary embodiment according to the present invention.

Bus 15 depicted in FIG. 1 contains both a data bus having data lines CH (CAN High) and CL (CAN Low), and supply potential lines $U_{BAT}$ (positive battery terminal) and GROUND (i.e., "MASSE") (negative battery terminal).

Amplifier units 21, 22, 23, 24 each drive a corresponding loudspeaker 31, 32, 33, 34 via their output stages. In order to set amplifier units 21, 22, 23, 24 to desired functional parameters, car radio 10 communicates with them via bus 15, thereby transmitting address and instruction data via the data bus. All amplifier units 21, 22, 23, 24 have the same base address.

To define a corresponding offset address, a corresponding coding plug VR, HR, VL, HL is provided between bus 15 and each of amplifier units 21, 22, 23, 24. In this context, VR=front right, HR=rear right, VL=front left, and HL=rear left, i.e. the respective installation positions in the motor vehicle.

The offset addresses allocated to the individual coding plugs VR, HR, VL, HL are defined in the present example as follows:

OFFSET ADDRESS (VR)=$00_{hex}$
OFFSET ADDRESS (HR)=$01_{hex}$
OFFSET ADDRESS (VL)=$02_{hex}$
OFFSET ADDRESS (HL)=$03_{hex}$ As mentioned above, the coding plug having offset address $00_{hex}$ is superfluous, and either can be entirely omitted or can be a dummy plug.

When operating, car radio 10 can thus first determine the number of identical amplifier units 21, 22, 23, 24 that are present, and because of the differing offset addresses they can then be addressed separately in order to perform specific functions.

The determination of the amplifier units 21, 22, 23, 24 that are present can proceed such that car radio 10 first addresses the entire address space and ascertains, based on incoming return messages, how many amplifier units are actually connected.

It is thus possible to install identical amplifier units, having the same base address, at any point in the motor vehicle. The desired instruction, for example "Reduce front left volume 3 dB," always reaches the correct amplifier 23 if the allocation has been performed properly, i.e. if coding plug VL is allocated to the correct amplifier 23.

If the wiring harnesses (chassis buses) located in the motor vehicles are already equipped at the manufacturing or installation stage with integrated coding plugs, incorrect allocation of the preinstalled coding plugs can in fact be ruled out from the outset.

Figure 2:
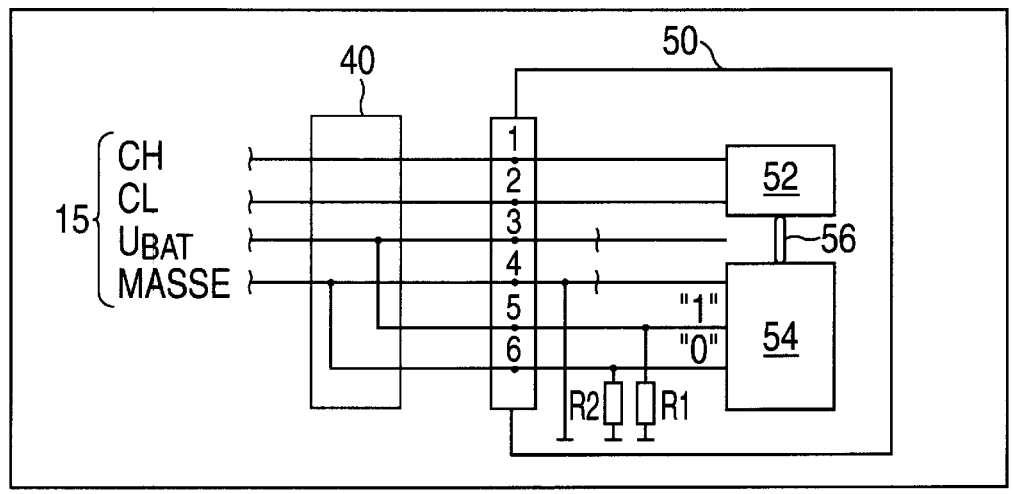
FIG. 2 shows a basic circuit diagram of an exemplary embodiment of a coding plug of the addressing apparatus for digital analysis according to the present invention.

FIG. 2 depicts a basic circuit diagram of an exemplary embodiment of a coding plug of the addressing apparatus according to the present invention, for digital analysis.

In FIG. 2, reference character 40 designates a coding plug for digital analysis which can be inserted between bus 15 and a network component (designated with reference character 50) to define the latter's offset address, which in this case is $01_{hex}$.

By analogy with FIG. 1, bus 15 has both a data bus with data lines CH (CAN High) and CL (CAN Low) and supply potential lines $U_{BAT}$ (positive battery terminal) and GROUND (negative battery terminal). These are guided into coding plug 40 as connectors on the input side.

On the output side, coding plug 40 has six connectors 1, 2, 3, 4, 5, 6 which in turn are guided into the input of the corresponding network component 50.

The connectors 1, 2, 3, 4 correspond to data lines CH (CAN High), CL (CAN Low), supply potential lines $U_{BAT}$ (positive battery terminal) and GROUND (negative battery terminal).

Connectors 1, 2 are guided into a bus interface 52. Connectors 3, 4 are used to supply voltage, and can be used at any desired point within network component 50. Finally, connectors 5, 6 are additionally provided to make available digital coding signals H (or logical "1") and L (or logical "0").

The two additional connectors 5, 6 can define four offset addresses corresponding to the signal combinations LL, HL, LH, HH. In general, with n additional connectors it is possible to define $2^n$ offset addresses for a corresponding $2^n$ identical network components, n being a natural number.

In the exemplary embodiment shown in FIG. 2, the digital coding signals for connectors 5 and 6 are picked off directly from supply potential lines $U_{BAT}$ and GROUND located in bus 15, so that connector 5 is at "1" and connector 6 is at "0". The offset address defined in this manner is accordingly $01_{hex}$.

In network component 50 that is depicted, connectors 5 and 6 are connected, with interposition of a respective pulldown resistor R1 and R2, to the input ports of a microcontroller 54 which analyzes the coding signals and transfers them via an internal bus 56 (or via an internal interface) to bus interface 52 so that the latter can use the entire address, i.e. base address+offset address.

The effect of pulldown resistors R1, R2 is that by default, i.e. in the absence of a coding plug, the coding address without a coding plug 40 is set to offset address $00_{hex}$.

FIG. 2 is a general depiction of one possible coding plug 40 of the addressing apparatus according to the present invention for digital analysis. Protective circuits for network component 50 that are regularly used in practice, or an additional level converter circuit to establish a specific logical level, are not shown therein, for example for reasons of clarity.

Figure 3:
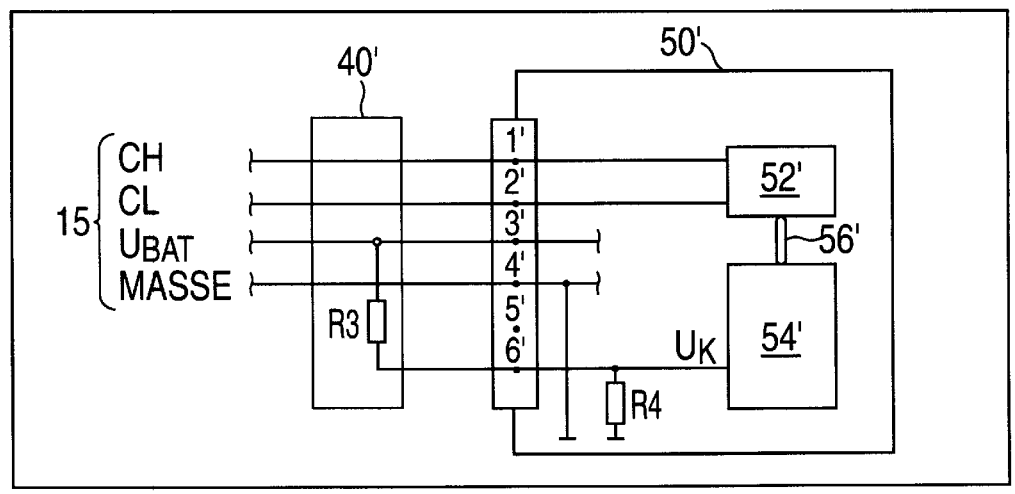
FIG. 3 shows a basic circuit diagram of an exemplary embodiment of a coding plug of the addressing apparatus for analog analysis according to the present invention.

FIG. 3 depicts a basic circuit diagram of an exemplary embodiment of a coding plug of the addressing apparatus according to the present invention, for analog analysis.

In FIG. 3, reference character 40' designates a coding plug for analog analysis which can be inserted between bus 15 and a network component (designated with reference character 50') to define the latter's offset address.

The lines of bus 15 are guided into coding plug 40' as connectors on the input side. On the output side, coding plug 40' has six connectors 1', 2', 3', 4', 5', 6' which in turn are guided into the input of network component 50'.

The connectors having reference characters 1', 2', 3', 4' correspond to data lines CH (CAN High) and CL (CAN Low) and to supply potential lines $U_{BAT}$ (positive battery terminal) and GROUND (negative battery terminal).

Connectors 1', 2' are guided into a bus interface 52'. Connectors 3', 4' serve to supply voltage, and can be used at any desired point within network component 50'.

Connector 5' is unoccupied (it could even be entirely omitted, but in terms of production engineering it may be advantageous to make no physical distinction between the number of connectors for the digital and for the analog coding plugs).

Finally, connector 6' is used to make available an analog coding signal $U_K$ which is applied to the input connector of a microcontroller with analog/digital converter 54' in network component 50', which converts analog coding signal $U_K$ into corresponding digital signals and transfers them via an internal bus 56' (or internal interface) to bus interface 52' so that the latter can use the entire address, i.e. base address+offset address.

The number of different offset addresses that can be generated using analog coding signal $U_K$ at the additional connector 6' depends substantially on the supply voltage available, the resolution of the analog/digital converter contained in microcontroller 54', and the operating reliability, in particular the noise sensitivity, of the system. The larger the voltage steps, the greater the insensitivity to interference. The smaller the voltage steps, the more offset addresses can be represented with them.

In the exemplary embodiment shown in FIG. 3, analog coding signal $U_K$ for connector 6' is tapped, via a voltage divider which consists of the two resistors R3, R4, from supply potential lines $U_{BAT}$ and GROUND located in bus 15, and can be calculated as:

$$U_K = (R3/[R3+R4]) * U_{BAT}$$

The one resistor R3 is located in coding plug 40', and is positioned between $U_{BAT}$ and connector 6'. The other resistor R4 is located in network component 50' and is positioned between connector 6' and GROUND.

With this configuration, resistor R4 simultaneously serves as the pulldown resistor, with the result that by default, i.e. in the absence of a coding plug, the coding address without coding plug 40' is set to offset address $00_{hex}$.

FIG. 3 is also a general depiction of a possible coding plug 40' of the addressing apparatus according to the present invention for analog analysis. Protective circuits for network component 50' that are regularly used in practice are not shown therein, for example, for reasons of clarity.

Although the present invention has been described above with reference to a preferred exemplary embodiment, it is not limited thereto, but rather can be modified in numerous ways.

In particular, the addressing apparatus according to the present invention can be used not only for car radios or other modules in a motor vehicle, for example windshield washer modules, power window modules, etc., but rather for any network having identical or different network components.

Although, as described in the above exemplary embodiment, the address was obtained by simple addition of the base address and the offset address, other possibilities for combination—for example subtraction or the like—can also be imagined.

According to the above exemplary embodiment, the coding signals were tapped from supply potential lines present in the bus.

Finally, the present invention is not limited to the static codings explained above, in the form of digital or analog direct-current coding signals, but also encompasses dynamic coding signals.

List of Reference Characters
1,2,3,4,5,6 Connectors for digital coding plug
1',2',3',4',5',6' Connectors for analog coding plug
10 Car radio
15 Bus (data bus+supply lines)
21,22,23,24 Amplifier units
31,32,33,34 Loudspeakers
VR,HR,VL,HL Coding plugs
40 Digital Coding plug
50 Network component for digital coding plug
52,52' Bus interface
54 Microcontroller
 56 Internal bus or interface
R1,R2 Pulldown resistors
40' Analog coding plug
50' Network component for analog coding plug
54' Microcontroller with A/D converter
56' Internal bus or interface
R3,R4 Voltage divider resistors
$U_{BAT}$,GROUND Supply potentials
H("1"),L("0"),$U_K$ Coding signals

What is claimed is:
1. An addressing apparatus for addressing network components, one of the network components being connected to another one of the network components via a bus, each of the network components having an address including a permanent base address and a linked offset address, comprising:

a device transmitting the address via the bus; and a coding device positioned between the bus and a respective network component of the network components, the coding device determining the offset address of the respective network component using at least one predetermined coding signal generated by the coding device, wherein the coding device includes a coding plug, the coding plug including (1) input connectors connecting the bus to the coding plug, (2) output connectors connecting the coding plug to an input arrangement of the respective network component so that data is transmitted between the bus and the input arrangement and (3) at least one coding connector delivering the at least one predetermined coding signal to the respective network component, and wherein the at least one coding connector utilizes the at least one predetermined coding signal from a bus supply potential line running through the coding plug.

2. The addressing apparatus according to claim 1, wherein the coding device includes a coding attachment plug.

3. The addressing apparatus according to claim 1, wherein the at least one coding connector includes a plurality of digital coding connectors, each of the digital coding connectors providing a digital coding signal and a number of the digital coding connectors being a natural number.

4. The addressing apparatus according to claim 3, wherein the digital coding signal is provided for analysis to input ports of a microcontroller of the respective network component.

5. The addressing apparatus according to claim 4, wherein the input ports are coupled to a reference potential arrangement via a pulldown resistor.

6. The addressing apparatus according to claim 1, wherein the at least one coding connector includes an analog coding connector, the analog coding connector providing an analog coding signal.

7. The addressing apparatus according to claim 6, wherein the coding plug uses the analog coding signal from supply potential lines via a voltage divider, the supply potential lines running via the bus.

8. The addressing apparatus according to claim 6, wherein the analog coding signal is provided for analysis to an input port of a microcontroller of the respective network component, the microcontroller including an analog-digital converter.

9. The addressing apparatus according to claim 8, wherein the input port is coupled to a reference potential arrangement via a pulldown resistor.

10. The addressing apparatus according to claim 7, wherein the voltage divider includes a first resistor and a second resistor, the first resistor being positioned in the coding plug and the second resistor being positioned in the respective network component.

11. The addressing apparatus according to claim 1, wherein the network components are identical to one another.

12. The addressing apparatus according to claim 1, wherein the bus includes a controller area network serial bus system.

13. The addressing apparatus according to claim 1, wherein the addressing apparatus is provided in a network situated in a motor vehicle and wherein the coding device is preinstalled at at least one corresponding point in a chassis bus of the motor vehicle.

14. A method for addressing network components, one of the network components being connected to another one of the network components via a bus, comprising the steps of:

providing a permanent base address to each of the network components;

linking an offset address to the permanent base address to form an address of a corresponding network component of the network components;

positioning a coding device between the bus and the corresponding network component to determine a corresponding offset address of the corresponding network component using at least one predetermined coding signal, the at least one predetermined coding signal being generated by the coding device, the coding device including a coding plug, the coding plug including (1) input connectors connecting the bus to the coding plug, (2) output connectors connecting the coding plug to an input arrangement of the corresponding network component so that data is transmitted between the bus and the input arrangement and (3) at least one coding connector delivering the at least one predetermined coding signal to the respective network component;

tapping, by the at least one coding connector, the at least one predetermined coding signal from a bus supply line running through the coding plug; and transmitting the address via the bus.

* * * * *